United States Patent [19]

Zieren

[11] Patent Number: 4,809,111
[45] Date of Patent: Feb. 28, 1989

[54] MAGNETIC HEAD FOR USE IN VERTICAL RECORDING

[75] Inventor: Victor Zieren, Eindhoven, Netherlands

[73] Assignee: U.S. Philips Corporation, New York, N.Y.

[21] Appl. No.: 40,443

[22] Filed: Apr. 16, 1987

[30] Foreign Application Priority Data

Jan. 23, 1987 [NL] Netherlands ................. 8700160

[51] Int. Cl.$^4$ ................................ G11B 5/127
[52] U.S. Cl. ......................... 360/125; 360/122
[58] Field of Search ........... 360/122, 123, 125, 127, 360/110

[56] References Cited

U.S. PATENT DOCUMENTS 4,604,670 8/1986 Visser ........................... 360/125 X
4,635,153 1/1987 Shimamura et al. ............ 360/125
4,670,807 6/1987 Gortes et al. ................... 360/125 X

FOREIGN PATENT DOCUMENTS 0178610 10/1984 Japan.

OTHER PUBLICATIONS

Grimm, "Ferrite Treatment", IBM TDB, Oct. 1975, vol. 18, No. 5, p. 1311.

Primary Examiner—Stuart N. Hecker
Assistant Examiner—David J. Severin
Attorney, Agent, or Firm—F. Brice Faller

[57] ABSTRACT

Magnetic head (1) for use in vertical recording comprising two protective blocks (5, 7) which jointly constitute a contact surface (S), and a magnetic pole (3) in the form of a thin film of a soft magnetic material enclosed between the two protective blocks. The magnetic head also comprises a winding aperture (13) and a coil W. At least one (7) of the two protective blocks is formed from one piece of ferrite having a high magnetostriction, a first portion (7A) consisting of a ferrite having a high magnetic permeability and a second portion (7B) consisting of a ferrite having only a low magnetic permeability.

6 Claims, 1 Drawing Sheet

MAGNETIC HEAD FOR USE IN VERTICAL RECORDING

BACKGROUND OF THE INVENTION

The invention relates to a magnetic head for use in vertical recording having a magnetic pole in the form of a thin film of a soft magnetic material and a body constituted by two protective blocks and having a contact surface to mate with a magnetic recording medium. The magnetic pole is enclosed between the protective blocks and extends up to the contact surface, at least one of the protective blocks having a first magnetic portion and a second portion distinct therefrom a winding aperture provided in the first portion causes a flux collect part present between the magnetic pole and the winding aperture and a flux return part to be separated. The second portion extends between the first portion and the contact surface and constitutes a boundary for the winding aperture. At least a winding is wound around at least the magnetic pole and the flux collect part through the winding aperture. A magnetic head of this type is known from European Patent Application EP No. 0,199,422 to which U.S. application Ser. No. 854,209 corresponds, herewith incorporated by reference).

In the art of short-wavelength magnetic recording it is known that vertical recording, that is to say recording in which the magnetisation in the magnetic layer of the recording medium is effected in a direction at right angles to the direction of movement of the recording medium and at right angles to the surface of the medium, is more favourable than recording in the longitudinal direction in which magnetisation is effected in the direction of movement of the recording medium. A reason for the effect is that the demagnetising field within the magnetic layer of the recording medium increases as the wavelength decreases in the case of recording in the longitudinal direction, whereas the demagnetising field decreases in the case of vertical recording. The recording medium may be in the form of a tape and it may consist of a support on which a soft magnetic layer and a recording layer are provided.

In vertical recording it is important that the main component of the magnetic field coming from the magnetic head is perpendicular to the magnetic recording medium as much as possible. The said known magnetic head has this property.

In the known magnetic head one of the protective blocks is entirely formed from a non-magnetic material and the other protective block is composed of two separate sub-blocks, a first sub-block of which is magnetic and a second is non-magnetic. The second sub-block extends from the bonding surface between the two sub-blocks up to the contact surface of the magnetic head. A groove extending up to the bonding surface and constituting the winding aperture is provided in the first sub-block. The magnetic pole is provided against the protective block formed from the non-magnetic material.

Technologically, the known magnetic head has the drawback that expensive and time-consuming extra polishing steps have to be performed during the manufacture of the magnetic head. This is due to the fact that one of the protective blocks is composed of two different materials so that a satisfactory bonding between the sub-blocks of the relevant protective block can only be ensured if the two sub-blocks, prior to their being joined at the bonding surface have a very satisfactory flatness and smoothness.

It is to be noted that a magnetic head for vertical recording is known from British Patent Application GB No. 2,126,408 in which each of the protective blocks is composed of a first magnetic sub-block and a second non-magnetic sub-block secured to the first block. In addition to the above-mentioned drawback, this known magnetic head has the further drawback that the magnetic pole in the form of a thin film is provided on one of the composite protective blocks. In fact, it is very difficult during manufacture of the magnetic head to get a completely smooth and flat side-face, generally a sawn face, of such a composite protective block. This is because the polishing process is not necessarily optimized for the different materials of the first and ssecond sub-blocks so that a step and/or a crack can sometimes by measured in the surface after the polishing process. This may cause an interrupted pole if the thin film is provided on such a polished sideface.

SUMMARY OF THE INVENTION

It is an object of the invention to provide an improved magnetic head for vertical recording which can be manufactured in a simpler manner and has a longer durability.

To this end the protective block in which the two portions can be distinguished is formed from one piece and consists up to the contact surface of a ferrite having a high magnetostriction, the ferrite in the first portion having a high magnetic permeability and the ferrite in the second portion having a low magnetic permeability due to internal stresses. Magnetostriction is herein to be understood to mean the magneto-elastic phenomenon which ocurs in ferromagnetic materials and in which the magnetisation of specimens of ferromagnetic materials changes when these specimens are subjected to mechanical stresses.

The magnetic head according to the invention can be manufactured in a considerably simpler way than the known magnetic heads because each of the separate protective blocks can be manufactured in a simple manner without using bonding techniques. Each protective block is in fact manufactured entirely from one and the same material.

It has been found that due to mechanical operations such as sawing and polishing carried out during the manufacture of the magnetic head permanent mechanical stresses are generated in a thin layer extending along the contact surface. The invention uses this phenomenon in a surprising manner by utilising these stresses for creating a non-magnetic zone or at least a zone with a smaller magnetic permeability of the material which is present. By using ferrites having a high magnetostriction for protective blocks can be manufactured in a simple manner without using bonding techniques. Each protective block is in fact manufactured entirely from one and the same material.

It has been found that due to mechanical operations such as sawing and polishing carried out during the manufacture of the magnetic head permanent mechanical stresses are generated in a thin layer extending along the contact surface. The invention uses this phenomenon in a surprising manner by utilising these stresses for creating a non-magnetic zone or at least a zone with a smaller magnetic permeability of the material which is present. By using ferrites having a high magnetostriction for protective blocks which should have a low permeability portion adjoining the contact surface the said portion is actually formed automatically during the manufacture of the magnetic head.

As compared with the magnetic head known from GB No. 2,126,408, an embodiment of the magnetic head in which the two protective blocks are formed at least substantially identically has the additional advantage that the thin film constituting the magntic pole can be provided on a uniform, stepless substrate surface during manufacture. In addition the construction as a whole is mechanically stronger and can resist greater forces, both during manufacture and during use.

A very favourable efficiency can be achieved if the winding aperture extends into the second portion. The winding aperture part present in the second portion then functions as an air gap between the flux collect part and the flux return part of the magnetic first portion and, as it were, it separates these two parts magnetically.

The winding aperture can be provided in a protective block by means of laser cutting. After laser cutting the contact surface may be formed by means of polishing, while also the second portion is formed by the occurring internal stresses. To ensure that the second portion, which as stated hereinbefore, has a low permeability, acquires the desired dimensions during manufacture, the choice of the ferrite used is important. Very good results in this respect are achievable with NiZn-ferrite.

With a view to wear inevitably occurring during use of the magnetic head and to ensure a long life-time of the magnetic head it is desirable that the second portion has dimensions perpendicular to the contact surface which are larger than 10 $\mu$m. For reasons of efficiency these dimensions will be preferably chosen below 20 $\mu$m.

DETAILED DESCRIPTION OF THE PREFERRED EMBODIMENTS

Figure 1:
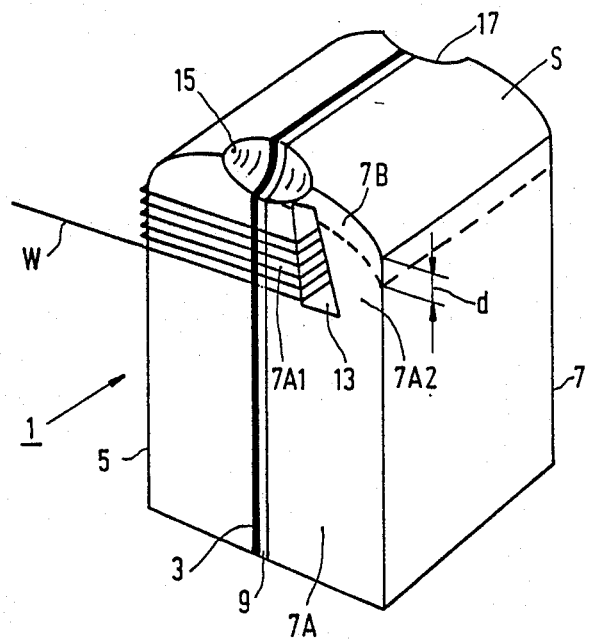
FIG. 1 is a perspective elevational view of a first embodiment of the magnetic head according to the invention and, FIG. 2 is a side view of a second embodiment of the magnetic head.
Figure 2:
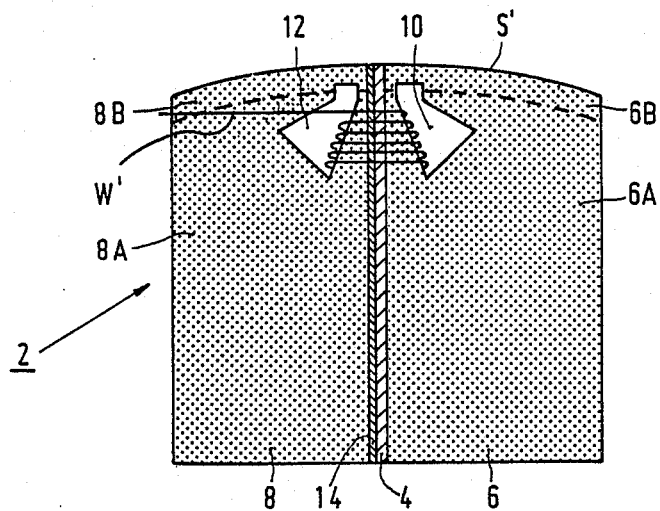

The magnetic head 1 shown in FIG. 1, likewise as the magnetic head 2 shown in FIG. 2, is intended for use in vertical recording. The magnetic head 1 comprises a magnetic pole 3 and two protective blocks 5 and 7 enclosing the pole 3. The magnetic pole 3 is in the form of a thin film of a soft magnetic material having a thickness of, for example 0.1 to 3 $\mu$m. The film may consist of, for example permalloy, a sendust alloy or an amorphous magnetic alloy and is provided on the protective block 5, for example by cathode-sputtering, vacuum-deposition or ion-plattering. The protective block 5 with the film present there on is secured to the protective block 7 by means of a bonding layer 9. The bonding layer 9 may be formed in various manners. For example, the bonding layer 9 may comprise an adhesive or a low melting point glass or one or more metals.

The protective block 5 consists of a non-magnetic material, for example quartz, Si, glass, glass-ceramic material or $Al_2O_3$. The protective block 7 consists of a ferrite having a high magnetostriction, preferably an NiAn-ferrite. After joining the two protective blocks 5 and 7 constituting, as it were, one body, they are provided with a contact surface S by means of mechanical operations such as polishing, on which contact surface a magnetic recording medium such as a magnetic tape can be passed.

Due to the choice of material and the mechanical operations to obtain the contact surface S a region adjoining the contact surface S is produced in the protective block 7, in which region the ferrite has only a low magnetic permeability due to internal stresses. Therefore two portions can be distinguished in the protective block 7, namely a first portion 7A in which the ferrite has a high magnetic permeability and a second portion 7B in which the ferrite has a low permeability. The low permeability region has a thickness d which will generally be between 10 and 20 $\mu$m in practice.

The magnetic head 1 has a coil formed from a number of turns W which is wound around the magnetic pole 3 and the protective block 5 through a winding aperture 13. The winding aperture 13 is provided in the protective block 7 by means of laser-cutting, whilst a flux collect part 7A1 is formed between the magnetic pole 3 and the winding aperture 13 and a flux return part 7A2 on the side of the order winding aperture 13 remote from the pole 3 is formed in the first portion of the protective block 7.

The winding aperture 13 which is preferably more or less tapered towards the contact surface S extends into the second portion 7B. It has been found that a winding aperture extending into the second portion has a higher efficiency. It has also been found that the efficiency can be still further improved by optimizing the shape of the winding aperture, it being important that the winding aperture has such a shape that a small reluctance is obtained in the path covered by the magnetic flux from the magnetic pole 3 via the recording medium to the flux return part 7A2. However, in this connection the dimensions and the shape of the flux collect part 7A1 are also important, which flux collect part 7A1 is also preferably tapered to some extent.

As is illustrated in FIG. 1, the magnetic head 1 has recesses 15 and 7 which are provided in the contact surface S in order to adjust the track width of the magnetic head. The track width may alternatively be adjusted by structuring the pole film 3 by means of a lithographic process in such a way that a film portion is produced which is narrower than the contact surface S. In that case the track width is of course formed before the two protective blocks 5 and 7 are bonded together.

The magnetic head 2 of FIG. 2 has a magnetic pole 4, a body constituted by two protective blocks 6 and 8 and having a contact surface S, and a coil W' consisting of a plurality of turns. Each of the two protective blocks 6 and 8 consists of one piece of ferrite having a high magnetostriction such as NiZn-ferrite in which a first and a second portion are produced due to the mechanical operations carried out to form the contact surface S'. In the protective blocks 6 and 8 the first portions 6A and 8A have a high magnetic permeability and the second portions 6B and 8B, respectively, have a low magnetic permeability due to internal stresss.

Winding apertures 10 and 12 for winding the coil W' around the pole 4 are provided in the two protective blocks 6 and 8, respectively. The two protective blocks 6 and 8 may be secured together by means of a bonding layer 14.

The invention is of course not limited to the embodiments shown. Materials different from the above-mentioned MiZn-ferrite may be alternatively used.

What is claimed is:

1. A magnetic head for use in vertical recording, comprising:
   a magnetic pole in the form of a thin film of a soft magnetic material,
   a body constituted by two protective blocks and having a contact surface to mate with a magnetic recording medium, the magnetic pole being enclosed between the protective blocks and extending up to the contact surface, at least one of the protective blocks having a first magnetic portion and a second portion distinct therefrom, a winding aperture being provided in the first portion and causing a flux collect part present between the magnetic pole and the winding aperture and a flux return part to be separated, the second portion extending between the first portion and the contact surface and constituting a boundary for the winding aperture, and
   at least a winding wound around at least the magnetic pole and the flux collect part through the winding aperture,
   characterized in that the protective block in which the two portiosn can be distinguished is formed from one piece and consists up to the contact surface of a ferrite having a high magnetostriction, the ferrite in the first portion having a high magnetic permeability and the ferrite in the second portion having a low magnetic permeability due to internal stresses.

2. A magnetic head claimed in claim 1, characterized in that the said ferrite is an NiZn-ferrite.

3. A magnetic head as claimed in claim 1, characterized in that the said second portion has dimensions perpendicular to the contact surface which are between 10 and 20 $\mu$m.

4. A magnetic head as claimed in claim 1, characterized in that the two protective blocks are at least formed substantially identically.

5. A magnetic head as claimed in claim 1, characterized in that the winding aperture extends into the second portion.

6. A magnetic head as claimed in claim 5, characterized in that the said second portion has dimensions perpendicular to the contact surface which are between 10 and 20 $\mu$m.

* * * * *